(12) United States Patent
Mayr et al.

(10) Patent No.: US 8,967,096 B2
(45) Date of Patent: Mar. 3, 2015

(54) CONDENSATION DEVICE

(71) Applicant: MAGNA STEYR Fahrzeugtechnik AG & Co. KG, Graz (AT)

(72) Inventors: Franz Mayr, St. Marein bei Graz (AT); Harald Pippenbach, Graz (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 96 days.

(21) Appl. No.: 13/677,811

(22) Filed: Nov. 15, 2012

(65) Prior Publication Data
US 2013/0125857 A1 May 23, 2013

(51) Int. Cl.
*F01M 13/00* (2006.01)
*F02M 25/025* (2006.01)
*F01M 13/04* (2006.01)

(52) U.S. Cl.
CPC .............. *F02M 25/025* (2013.01); *F01M 13/04* (2013.01); *F01M 2013/0477* (2013.01)
USPC .................................................... 123/41.86

(58) Field of Classification Search
CPC ............ F01M 11/08; F01M 2013/005; F01M 2013/0055; F01M 2013/0061; F01M 2013/0066; F01M 2013/0072; F01M 2013/0042; F01M 2013/0427; F01M 2013/0455; F01M 2013/0472; F01M 2013/0477
USPC ........... 123/572–574, 196 CP, 196 AB, 41.86
See application file for complete search history.

(56) References Cited

U.S. PATENT DOCUMENTS

| | | | | | |
|---|---|---|---|---|---|
| 2,029,216 | A | * | 1/1936 | Barker | 123/41.86 |
| 2,984,226 | A | * | 5/1961 | Court | 123/41.31 |
| 3,509,967 | A | * | 5/1970 | Ballard | 184/6.24 |
| 3,533,384 | A | | 10/1970 | Bennett | |
| 3,828,744 | A | * | 8/1974 | Hollins | 123/573 |
| 5,329,913 | A | * | 7/1994 | Suzuki et al. | 123/573 |
| 5,460,147 | A | * | 10/1995 | Bohl | 123/572 |
| 5,937,837 | A | * | 8/1999 | Shaffer et al. | 123/573 |
| 6,148,807 | A | * | 11/2000 | Hazen | 123/572 |
| 6,684,864 | B1 | * | 2/2004 | Busen et al. | 123/572 |
| 7,980,233 | B2 | * | 7/2011 | Wagner et al. | 123/572 |
| 2009/0266346 | A1 | | 10/2009 | Wagner et al. | |

FOREIGN PATENT DOCUMENTS

| | | |
|---|---|---|
| DE | 22 20 565 A1 | 1/1973 |
| GB | 371131 A | 4/1932 |
| GB | 2285234 A | 7/1995 |
| JP | S57-022612 A | 2/1982 |
| JP | 59 105913 A | 6/1984 |
| JP | 61-92708 | 6/1986 |
| JP | 2009-68429 A | 4/2009 |
| JP | 2009-103082 | 5/2009 |
| JP | 2009-180183 A | 8/2009 |
| WO | 2007/098523 A1 | 9/2007 |
| WO | 2010/037829 A1 | 4/2010 |

* cited by examiner

*Primary Examiner* — Hung Q Nguyen
(74) *Attorney, Agent, or Firm* — Jordan IP Law, LLC; Todd A. Vaughn

(57) ABSTRACT

A condensation device for an engine having a water-containing lubricant. The condensation device includes a first fluid line configured to permit a flow of vaporized water to be discharged from the engine under its natural convection, a pressure-compensation device configured to permit a flow of air out of the condensation device; and a second fluid line configured to permit condensate from the flow of vaporized water in the first fluid line to flow to the engine.

20 Claims, 6 Drawing Sheets

CONDENSATION DEVICE

CROSS-REFERENCE TO RELATED APPLICATIONS

The present application claims priority under 35 U.S.C. §119 to European Patent Application No. 11189720.3 (filed on Nov. 18, 2011), which is hereby incorporated by reference in its entirety.

FIELD OF THE INVENTION

Embodiments of the invention relate to a condensation device for an engine with water-containing lubricant, which comprises a first line through which the vaporised water is discharged from the engine under its natural convection, and a pressure-compensation device via which air can escape from the condensation device.

BACKGROUND OF THE INVENTION

In oil-lubricated gearboxes, a ventilation opening is provided which, as the temperature rises and falls in operation of the gearbox, allows a pressure balance with the environment and is usually designed as a device with fittings to retain oil mist and exclude dirt from the environment.

WO 2007/098523 A1 discloses a water-containing lubricant which as well as a high proportion of water contains a medium for lowering the freezing point, for example glycol, and further additives or suspended matter. Further details of this and the benefits which can be achieved with such a lubricant are given in the publication.

German Patent Publication DE 22 20 565 discloses a recirculating cooling system for oil-lubricated reducing gears. A fan recirculates air containing oil vapour from the interior of the gearbox through a heat exchanger and back to the gearbox. The condensed oil is returned separately. There is no pressure balance with the environment.

WO 2010/037829 A1 discloses a ventilation device for gearboxes with water-containing lubricant. The ventilation device is connected with the gearbox via a line. The device has a condenser in which inflowing water vapour can condense so that the condensate drains back into the gearbox via the same line.

All of the aforementioned condensation devices are designed to condense vapour from gearbox lubricants. To lubricate combustion engines or to lubricate and cool electric motors, normally oil is used. When a fluid lubricant containing water is used in internal combustion engines or also in electric motors, because of the high thermal load and temperatures significantly higher than 100° Celsius, a massive evaporation of the water component occurs, and hence, a continuous reduction in and change in the composition of the lubricant and coolant. In contrast to gearboxes, the rapid and high temperature input from components such as the cylinders of an internal combustion engine or the windings in an electric motor evaporates the water component of the lubricant immediately, leading to great expansion of the water and the formation of water vapour. This greatly increased expansion causes a rise in the flow speed in the ventilation system, and a condensation device as described in WO 2010/037829 can no longer condense adequately.

SUMMARY OF THE INVENTION

Embodiments in accordance with the invention eliminates the aforementioned disadvantages and counter the loss of water to the environment on a strong formation of water vapour.

In accordance with embodiments, a condensation device for an engine with water-containing lubricant includes at least one of the following: a first line through which vaporised water from the water-containing lubricant is discharged from the engine under its natural convection, a pressure-compensation device via which air can escape from the condensation device, and a second line different from and cooler than the first line, through which the condensate can return to the engine.

In accordance with embodiments, a condensation device for an engine having a water-containing lubricant includes at least one of the following: a first fluid line configured to permit a flow of vaporized water from the water-containing lubricant to be discharged from the engine under its natural convection, a pressure-compensation device configured to permit a flow of air out of the condensation device; and a second fluid line configured to permit condensate from the flow of vaporized water in the first fluid line to flow to the engine.

In accordance with embodiments, a condensation device for an engine having a water-containing lubricant includes at least one of the following: a first fluid line configured to receive a flow of vaporized water from the water-containing lubricant from the engine; a condenser in fluidic communication with the first fluid line and configured to receive and condense the flow of vaporized water from the first fluid line; and a second fluid line in fluidic communication with the condenser and configured to receive the condensate from the condenser and return the condensate to the engine.

In accordance with embodiments, an engine having a water-containing lubricant includes at least one of the following: a condensation device including a first fluid line configured to permit a flow of vaporized water from the water-containing lubricant to be discharged from the engine under its natural convection, a pressure-compensation device configured to permit a flow of air out of the condensation device; and a second fluid line configured to permit condensate from the flow of vaporized water in the first fluid line to flow to the engine.

In accordance with embodiments, for condensation, a heat discharge is required which can be achieved in various ways. In the condensation device according to the invention, a second line is used through which condensed water vapour can be returned to the region of the engine, in particular into a lubricant sump. In a simple construction without additional cooling devices, the heat discharge is achieved in that the vaporized and finally condensed water is guided through the entire pipe system of the first and second lines and thus cooled. The first line, due to the initially hot water vapour, is significantly warmer than the second line which substantially serves to return the already condensed water.

A second line different from the first line here means that the same regions of the first line, through which water vapour from the engine region has already passed, are not also used for the return of condensate to the engine region. A second line different from the first line can also be formed by a separate line segment of a conduit pipe common to the first line.

Refinements of the invention are described in the subclaims, the description and the attached drawings.

In accordance with embodiments, preferably a condensation device includes a condenser with a first heat-dissipation mechanism or device arranged between and/or in fluidic communication with the first and the second lines, in a manner such that inflowing vaporized water can be condensed by the condenser. With a condensation device having a cooling device, the water vapour rising through the first line can be cooled in a targeted manner, and thus, the water contained condensed. Hence only already cooled and condensed water passes through the second line which is arranged downstream of the condenser, so that the temperature in the second line also falls and the water can flow back unhindered to the engine region.

In accordance with embodiments, the condensation device can further include a second heat-dissipation mechanism or device arranged on and/or in fluidic communication with the second line. A second cooling after the condenser achieves that any residual water vapour can be condensed out further and in this manner the strong evaporation which occurs on lubrication of combustion engines and electric motors can be managed. The fluid additionally obtained and condensed is supplied to the lubricant sump via the second line.

In accordance with embodiments, the second heat-dissipation mechanism or device can be an air dryer, for example, a mechanical air dryer such as a centrifugal separator or cyclone separator. The high flow speed of the water vapour causes a sufficiently high rotation or centrifugal force for a cyclone separator. An air dryer also has the advantage that it not only extracts moisture from the inflowing fluid but also contaminants.

In order to avoid the effects of pressure fluctuations from the ventilated engine housing into the cooling devices, with a condensation device in accordance with embodiments of the invention, preferably a regulated condensate diverter is arranged on and/or in fluidic communication with the second line. In particular, the pistons moving in the crankcase of an internal combustion engine cause pressure fluctuations. For example, when a specific fluid level is reached in the condensate diverter, or depending on a time interval, the engine load, temperature of surrounding components or fluids, an accelerator pedal setting and similar, the condensate discharge is opened so that condensate can be returned to the lubricant and cooling circuit.

The regulated condensate diverter is preferably arranged in or after the second heat-dissipation means, in particular after an air dryer or cyclone separator. Thus, the repulsion of water back to the air dryer can be prevented. The regulated condensate diverter can be a float or rotary valve condensate diverter or an electrically or mechanically controlled valve.

When the engine has stopped, depending on the form of the condensate diverter, a residual quantity of water may remain in the condensate diverter and freeze at low temperatures, which would have a disadvantageous effect on the function of the condensation device. Therefore, in accordance with embodiments, the condensation device can include a heating device arranged in the region of the regulated condensate diverter.

Alternatively or additionally, to prevent the problems described at low ambient temperatures, the regulated condensate diverter can be designed such that it is open or otherwise in an active state when the engine has stopped, so that condensate can drain down to the engine. When the engine is started, the condensate diverter, for example, a valve, can remain open until positive temperatures are reached in the ventilation circuit.

In accordance with embodiments of the invention, the pressure-compensation device is formed as a ventilation opening through which air can escape to the environment of the condensation device. This is advantageous in particular if the air has been cleaned by an air dryer before escape.

In accordance with embodiments of the invention, the pressure-compensation device is formed such that air can escape through the pressure-compensation device to the region of the engine. The air can in particular be returned to the air intake tract of the internal combustion engine.

BRIEF DESCRIPTION OF THE DRAWINGS

Embodiments of the invention will be explained in more detail below in the schematic figures of the drawing, in which.

DETAILED DESCRIPTION OF EMBODIMENTS

Figure 1:
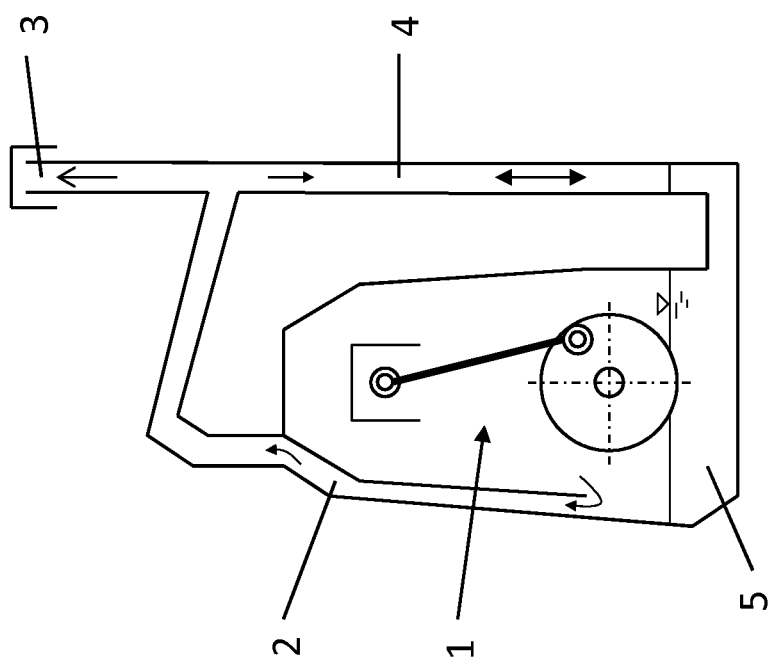
FIG. 1 illustrates a diagrammatic depiction of a condensation device in accordance with embodiments of the invention.

As illustrated in FIG. 1, a condensation device in accordance with embodiments of the invention for an engine 1 with water-containing lubricant. The lubricant collects below the engine 1 in a sump 5. By evaporation of the water-containing lubricant, water vapour rises from the sump 5 through a first fluid line 2 in fluidic communication with the sump 5, and is thus discharged from the hottest zone in the vicinity of the engine 1. Above all in the region between a first fluid line 2 and a second fluid line 4 in fluidic communication with the first fluid line 2 and the sump 5, water condenses out of the water vapour in the fluid line circuit, and thus, flows back through the second fluid line 4 into the lubricant sump 5. Air released on condensation can escape through the pressure-compensation device 3. In the embodiment illustrated in FIG. 1, the pressure-compensation device 3 is formed by a ventilation opening and the air escapes into the environment of the condensation device.

Figure 2:
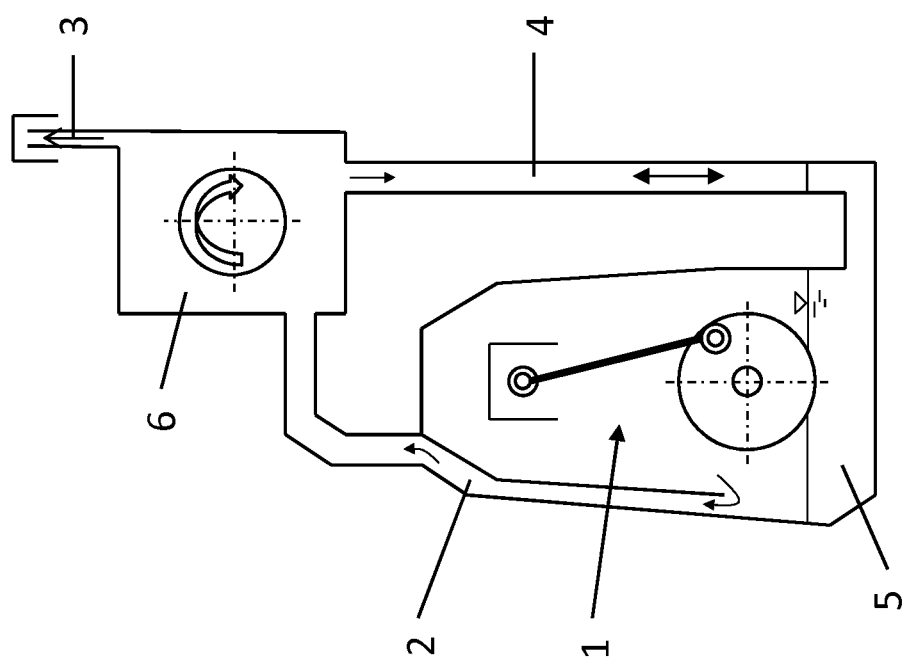
FIG. 2 illustrates a diagrammatic depiction of a condensation device in accordance with embodiments of the invention.

As illustrated in FIG. 2, arranged between and in fluidic communication with the first fluid line 2 and the second fluid line 4 is a condenser 6 with a cooling device. In the region of the condenser 6, a large part of the water vapour condenses into water which runs down through the second fluid line 4. The separated air can escape through the ventilation opening 3 in fluidic communication with the condenser 6.

Figure 3:
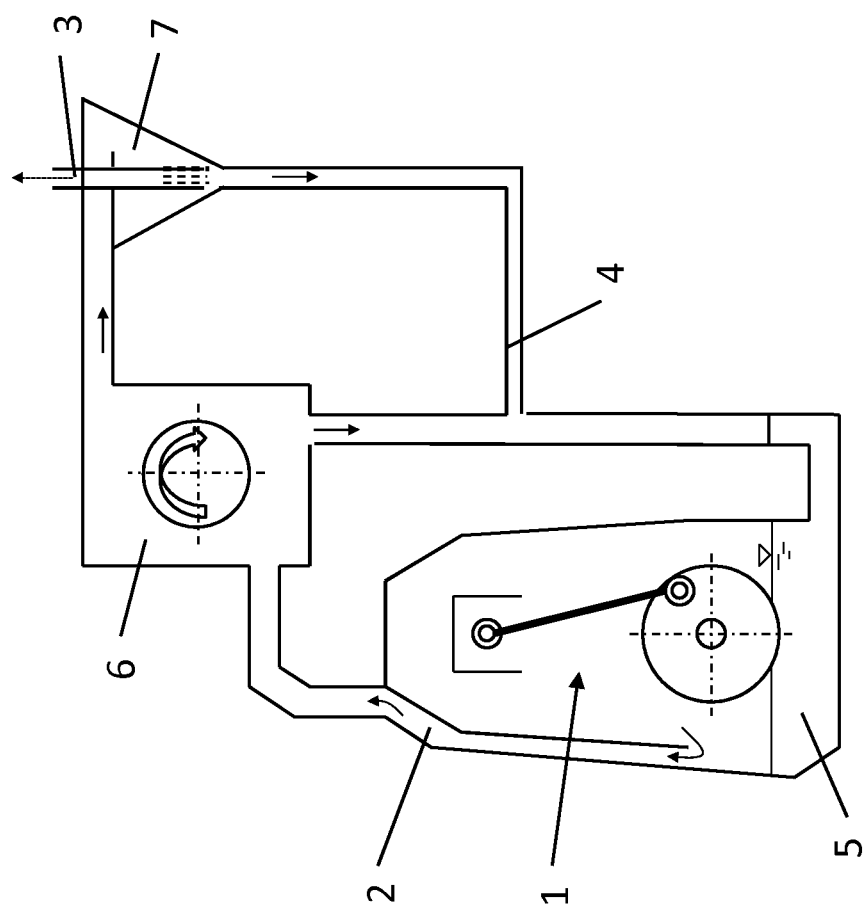
FIG. 3 illustrates a diagrammatic depiction of a condensation device in accordance with embodiments of the invention.

As illustrated in FIG. 3, after the condenser 6, a second heat-dissipation device or mechanism 7 can be arranged, i.e., a second cooling device in fluidic communication with the condenser 6 and the second fluid line 4. The second cooling device is here formed as a cyclone separator. The pressure-compensation device 3 is arranged in the region of the cyclone separator and air escapes into the environment.

Figure 4:
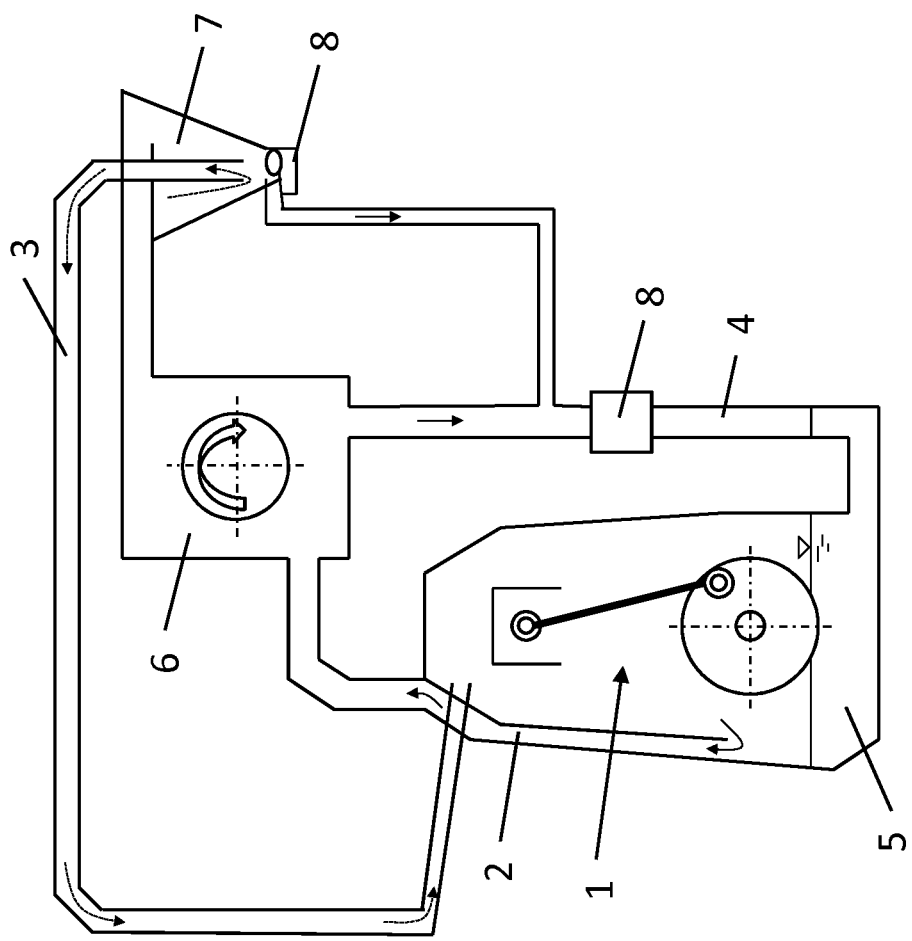
FIG. 4 illustrates a diagrammatic depiction of a condensation device in accordance with embodiments of the invention.

As illustrated in FIG. 4, in contrast, the pressure-compensation device 3 is formed such that the air is guided through a further fluid line into the intake chamber of the combustion engine 1, and thus, supplied for combustion by the engine 1. Furthermore provided are condensate diverters 8, the first of which is arranged in fluidic communication with and/or connected to the cyclone separator and designed as a collection container with float opener or electrically activated valve. The second condensate diverter 8 is arranged after a merging of second fluid lines 4 running in parallel which firstly lead back after the condenser 6 directly to the lubricant sump 5 and secondly after the condenser 6 via the second heat-dissipation device 7 to the sump 5.

Figure 5:
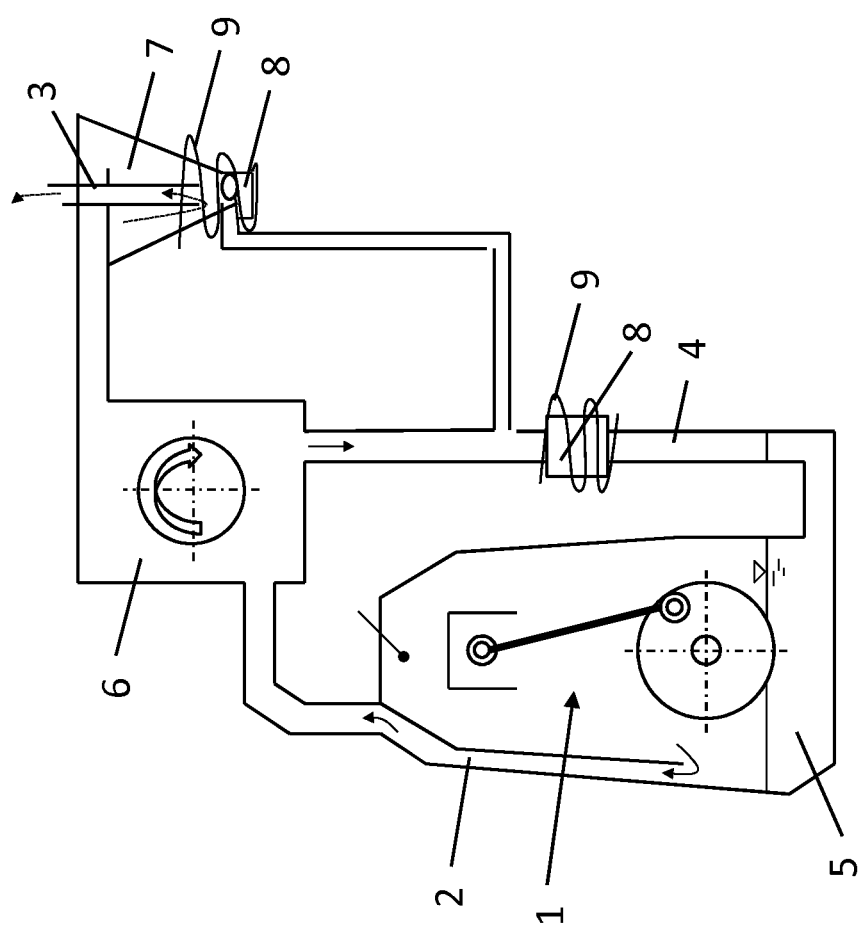
FIG. 5 illustrates a diagrammatic depiction of a condensation device in accordance with embodiments of the invention.

As illustrated in FIG. 5, in the region of the condensate diverter 8, heating devices 9 can be arranged, for example, heating coils, which prevent freezing of the condensate at low temperatures.

Figure 6:
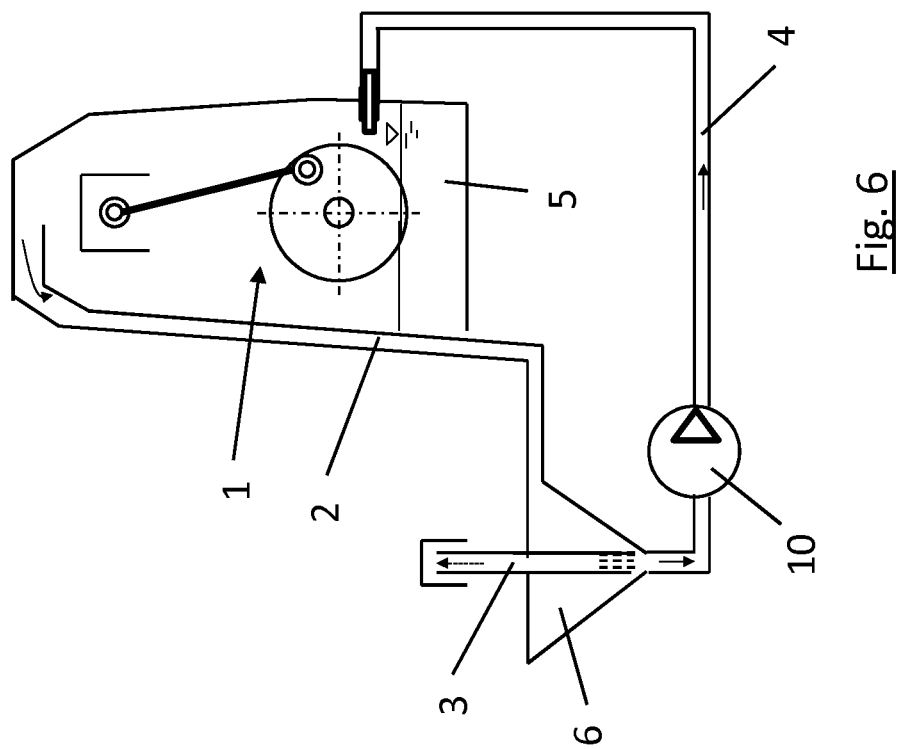
FIG. 6 illustrates a diagrammatic depiction of a condensation device in accordance with embodiments of the invention.

As illustrated in FIG. 6, a condenser 6, for example an air dryer, is arranged spatially below the lubricant sump 5. Water vapour passes through the fluid line 2 to the heat-dissipation device provided. In this case, the condensate is returned to the lubricant sump 5 by way of a pump 10.

Embodiments in accordance with the invention are advantageous in providing reliable condensation of water vapour for an engine that utilizes a water-containing lubricant.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A condensation device for an engine having a water-containing lubricant, the condensation device comprising:
    a first fluid line through which flows vaporized water from the water-containing lubricant discharged from the engine;
    a condenser having a first heat-dissipation device to receive the vaporised water from the first fluid line and perform a first condensing of the vaporised water,
    a pressure-compensation device in fluidic communication with the first heat-dissipation device and which permits air from the condenser to exit to the environment;
    a second heat-dissipation device arranged downstream of the first heat-dissipation device and which receives the vaporised water from the first heat-dissipation device to perform a second condensing of the vaporised water; and
    a second fluid line in fluidic communication with the second heat-dissipation device to permit the vaporized water after the second condensing to flow to the engine.

2. The condensation device of claim 1, wherein the second heat-dissipation device comprises an air dryer.

3. The condensation device of claim 2, wherein the air dryer comprises a cyclone separator.

4. The condensation device of claim 1, wherein the pressure-compensation device comprises a ventilator.

5. The condensation device of claim 1, wherein, during operation of the engine, the first fluid line operates at a first operation temperature and the second fluid line operates at a second operation temperature which is less than the first operation temperature.

6. An engine, comprising:
    a condensation device including:
        a first fluid line through which flows vaporized water from a water-containing lubricant discharged from the engine;
        a condenser having a first heat-dissipation device to receive the vaporised water from the first fluid line and perform a first condensing of the vaporised water;
        a pressure-compensation device in fluidic communication with the first heat-dissipation device and which permits air from the condenser to exit to the environment;
        a second heat-dissipation device arranged downstream of the first heat-dissipation device and which receives the vaporised water from the first heat-dissipation device to perform a second condensing of the vaporised water;
        a second fluid line in fluidic communication with the second heat-dissipation device, and through which flows the vaporized water after the second condensing; and
        a third fluid line in fluidic communication with the condenser, the second fluid line and the engine, and which supplies the engine with the vaporized water after the first condensing and the second condensing.

7. The engine of claim 6, wherein the second heat-dissipation device comprises an air dryer.

8. The engine of claim 7, wherein the air dryer comprises a cyclone separator.

9. The engine of claim 6, wherein the pressure-compensation device comprises a ventilator.

10. The engine of claim 6, wherein, during operation of the engine, the first fluid line operates at a first operation temperature and the second and third fluid lines respectfully operate at a second operation temperature which is less than the first operation temperature.

11. A condensation device for an engine, the condensation device comprising:
    a first fluid line through which flows vaporized water from a water-containing lubricant discharged from the engine;
    a condenser having a first heat-dissipation device to receive the vaporised water from the first fluid line and perform a first condensing of the vaporised water;
    a pressure-compensation device in fluidic communication with the first heat-dissipation device and which permits air from the condenser to exit to the environment;
    a second fluid line in fluidic communication with the pressure-compensation device and through which the air is guided into an intake chamber of the engine;
    a second heat-dissipation device arranged downstream of the first heat-dissipation device and which receives the vaporised water from the first heat-dissipation device to perform a second condensing of the vaporised water;
    a first condensate diverter in fluidic communication with the second heat-dissipation device, and which regulates the vaporised water after the second condensing;
    a third fluid line in fluidic communication with the second heat-dissipation device, and through which flows the vaporized water after the second condensing; and
    a fourth fluid line in fluidic communication with the condenser, the second fluid line and the engine, and which supplies the engine with the vaporized water after the first condensing and the second condensing.

12. The condensation device of claim 11, further comprising a first heating device arranged adjacent to the first condensate diverter.

13. The condensation device of claim 11, further comprising a second condensate diverter in fluidic communication with the condenser and the second heat-dissipation device, and which regulates the vaporised water after the first and second condensings.

14. The condensation device of claim 13, further comprising a second heating device arranged adjacent to the second condensate diverter.

15. The condensation device of claim 13, wherein the first and second condensate diverters each comprise a float condensate diverter.

16. The condensation device of claim 13, wherein the first and second condensate diverters each comprise an electrically controlled valve.

17. The condensation device of claim 13, wherein the first and second condensate diverters each comprise a mechanically controlled valve.

18. The condensation device of claim 13, wherein the first and second condensate diverters are actuated when a specific fluid level is reached in each respective condensate diverter.

19. The condensation device of claim 11, wherein the second heat-dissipation device comprises an air dryer.

20. The condensation device of claim 11, wherein, during operation of the engine, the first fluid line operates at a first operation temperature and the third and fourth fluid lines operates at a second operation temperature which is less than the first operation temperature.

* * * * *